United States Patent
Li et al.

(10) Patent No.: US 9,936,392 B2
(45) Date of Patent: Apr. 3, 2018

(54) METHOD FOR CONFIGURING QUIET PERIOD IN COGNITIVE RADIO SYSTEM AND DEVICE THEREOF

(71) Applicant: CHINA ACADEMY OF TELECOMMUNICATIONS TECHNOLOGY, Beijing (CN)

(72) Inventors: Yuanyuan Li, Beijing (CN); Wenling Bai, Beijing (CN); Chenggang Jiang, Beijing (CN); Yu Yang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 205 days.

(21) Appl. No.: 14/375,807

(22) PCT Filed: Feb. 4, 2013

(86) PCT No.: PCT/CN2013/071339
§ 371 (c)(1),
(2) Date: Jul. 31, 2014

(87) PCT Pub. No.: WO2013/123852
PCT Pub. Date: Aug. 29, 2013

(65) Prior Publication Data
US 2015/0003273 A1    Jan. 1, 2015

(30) Foreign Application Priority Data
Feb. 20, 2012  (CN) .......................... 2012 1 0039077

(51) Int. Cl.
*H04W 74/08* (2009.01)
*H04W 16/14* (2009.01)
*H04W 24/08* (2009.01)

(52) U.S. Cl.
CPC ........... *H04W 16/14* (2013.01); *H04W 24/08* (2013.01)

(58) Field of Classification Search
CPC ......... H04W 72/0453; H04W 74/08–74/0858; H04W 28/044
(Continued)

(56) References Cited

U.S. PATENT DOCUMENTS

2010/0135226 A1* 6/2010 Chandramouli ...... H04W 36/02
370/329
2010/0232380 A1* 9/2010 Choi .................... H04W 72/082
370/329
(Continued)

FOREIGN PATENT DOCUMENTS

CN     101878664 A     11/2010
CN     102547749 A     7/2012
(Continued)

OTHER PUBLICATIONS

International Search Report dated Apr. 18, 2013 re: PCT/CN2013/071339; citing: CN 102547749 A, CN 101878664 A and KR 20100081757 A.
(Continued)

*Primary Examiner* — Andrew Chriss
*Assistant Examiner* — Kenan Cehic
(74) *Attorney, Agent, or Firm* — Cantor Colburn LLP (57) ABSTRACT

Various examples of the present disclosure describe a method for configuring a quiet period in a CR system and a device thereof. The method includes: determining, by a base station, a maximum value of a quiet period parameter of a CR system based on maximum duration of interference which a radio authorization system tolerates and maximum loss of capacity which the CR system tolerates; determining a sensing algorithm based on a detecting performance
(Continued)

requirement and the maximum value of the quiet period parameter; determining a value of the quiet period parameter based on the sensing algorithm; and sending the quiet period parameter to a terminal of the CR system. When the examples of the present disclosure are employed, the rationality of the configuration of the quiet period parameter of the CR system is improved and the capacity loss of the CR system is reduced when the interference to the authorization system is reduced.

12 Claims, 4 Drawing Sheets

(58) Field of Classification Search
USPC ...... 370/311, 314, 347; 455/454, 464, 114.2
See application file for complete search history.

(56) References Cited

U.S. PATENT DOCUMENTS

| | | | | |
|---|---|---|---|---|
| 2010/0246442 | A1* | 9/2010 | Wang | H04W 16/14 370/254 |
| 2010/0304772 | A1* | 12/2010 | Wang | H04W 56/003 455/509 |
| 2011/0128895 | A1* | 6/2011 | Sadek | H04W 16/14 370/280 |
| 2011/0263209 | A1* | 10/2011 | Kasslin | H04W 72/085 455/67.11 |
| 2011/0299509 | A1* | 12/2011 | Wang | H04W 16/14 370/336 |
| 2012/0113918 | A1* | 5/2012 | Freda | H04W 16/14 370/329 |
| 2012/0320741 | A1* | 12/2012 | Freda | H04W 16/14 370/229 |
| 2013/0237238 | A1* | 9/2013 | Kronander | H04W 48/16 455/452.1 |

FOREIGN PATENT DOCUMENTS

| | | |
|---|---|---|
| KR | 20100081757 A | 7/2010 |
| WO | 2009069069 A2 | 6/2009 |

OTHER PUBLICATIONS

EP Search Report for PCT/CN2013/071339, filed on Feb. 4, 2013. The search report was dated Jun. 3, 2015.
Carlos Cordeiro et al. "Spectrum Sensing for Dynamic Spectrum Access of TV Bands".
Mubaraq Mishra et al: "How much white space is there?"
EP office action: dated Jan. 20, 2015.
English Translation of Office Action 1 From SIPO (China).
English Translation of Office Action 2 From SIPO (China).

* cited by examiner

METHOD FOR CONFIGURING QUIET PERIOD IN COGNITIVE RADIO SYSTEM AND DEVICE THEREOF

CROSS-REFERENCE TO RELATED APPLICATIONS

This application is a U.S. National Phase application under 35 U.S.C. § 371 of International Application No. PCT/CN2013/071339, filed Feb. 4, 2013. This application claims the priority of a Chinese patent application No. 201210039077.0, filed Feb. 20, 2012, entitled "METHOD FOR CONFIGURING QUIET PERIOD IN COGNITIVE RADIO SYSTEM AND DEVICE THEREOF". The entire disclosures of each of the above applications are incorporated herein by reference.

FIELD OF THE INVENTION

Examples of the present disclosure relate to wireless communication technologies, and more particularly, to a method for configuring a quiet period in a cognitive radio (CR) system and a device thereof.

BACKGROUND OF THE INVENTION

Radio communication spectrums are valuable natural resources. With rapid development of the wireless communication technologies, spectrum resources are increasingly scarce. In order to ease the strain on the spectrum resources, relevant departments and agencies have monitored and studied the wireless communication spectrums, and found that some frequency bands (such as a frequency band for television) are not used in most of time or not used within most areas, while multi-user or multi-system contention occurs in some other frequency bands. In other words, some systems with heavy service loads do not have sufficient spectrum resources, while other systems with small service loads take up too many resources. The concept of CR emerges under this background. The basic principle of CR is described as follows. Under the premise of not interfering an authorization system, a CR system may dynamically select a white space frequency for communication through monitoring changes of a current wireless environment.

When the CR system opportunistically uses the white space frequency of the authorization system, a basic premise is to protect the authorization system from interference. The protection mainly includes two aspects. One aspect is that the CR system may accurately determine which frequency of the authorization system is an available white space frequency (introduction of the CR system on this frequency may not affect normal work of the authorization system). The other aspect is that when an occupied frequency is no longer available, the CR system may timely return the occupied frequency to the authorization system.

There are mainly two methods for detecting a white space frequency. The first method is a database method, in which through accessing an information database of the authorization system, the CR system obtains using information about frequencies of an authorization system in a certain area, and further determines which frequency is free and available. The second method is a sensing/detecting method, in which a sensing/detecting module of the CR system detects authorization system signals on different frequencies. When it is detected that an input parameter is greater than a threshold, the sensing/detecting module determines that an authorization system signal exists on a frequency and the frequency is not available to the CR system. Otherwise, the frequency is available to the CR system.

There are three typical sensing algorithms (or referred to as detection algorithms) for detecting an authorized signal, i.e., energy detection, matched filter detection, and self-correlation detection. To achieve a certain detecting performance, any of the sensing algorithms has requirements on receiving and collecting time of a signal and a receiving carrier interference ratio of the signal.

Figure 1:
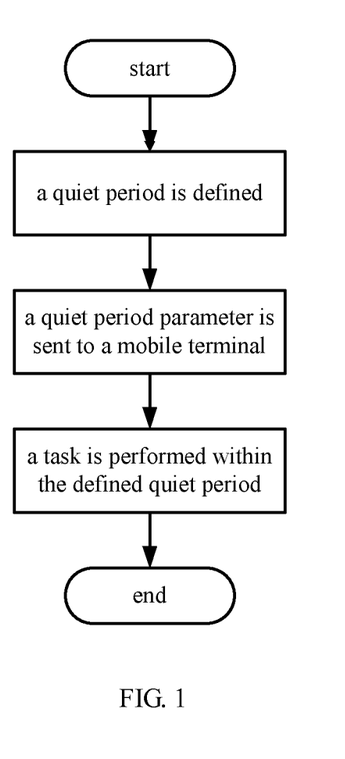
FIG. 1 is a schematic flowchart illustrating a process for configuring a quiet period in the prior art.

However, during the sensing detecting, since the CR system is also working on an authorized frequency, a signal of the CR system may interfere the sensing detecting on the authorization system signal. A commonly-used method is to configure a quiet period (also referred to as silence period). In this case, during the sensing detecting, the CR system stops sending any data on a corresponding frequency within the quiet period, so as to ensure that the frequency is not interfered. A typical quiet period mainly includes parameters such as a period cycle, the offset within the period cycle, and the duration of the quiet period, etc. FIG. 1 is a schematic flowchart illustrating a process for configuring the quiet period. As shown in FIG. 1, when a quiet period parameter is defined, the quiet period parameter is sent to a terminal.

As can be seen that the more frequently the sensing detecting is performed, i.e., the more frequent the quiet is, the greater the chance for discovering the authorization system is, the more timely the operation of exiting the frequency of the authorization system is performed, and the smaller the interference to the authorization system is. However, if the duration of the quiet period of the CR system is too long or the quiet is performed too often, the capacity of the CR system may be greatly affected, therefore there is no sense in using the white space frequency to improve the system capacity.

Previous studies on the quiet period focus on how to configure and transfer the quiet period parameter among multiple terminals. However, the value of the quiet period parameter not only affects the interference to the authorization system and the capacity of the sensing system, but also affects the selection of the sensing algorithm, thereby affects the hardware complexity when the system is implemented. As such, the quiet period parameter may be reasonably configured, so as to reduce the interference to the authorization system and control the loss of the CR system.

SUMMARY OF THE INVENTION

Various examples of the present disclosure describe a method and a device for configuring a quiet period in a CR system, so as to improve the rationality of configuration of the quiet period parameter of the CR system.

Examples of the present disclosure describe a method for configuring a quiet period in a cognitive radio (CR) system, including:
  determining, by a base station, a maximum value of a quiet period parameter of a CR system;
  determining, by the base station, a sensing algorithm based on a detecting performance requirement and the maximum value of the quiet period parameter;
  determining, by the base station, a value of the quiet period parameter based on the sensing algorithm; and
  sending, by the base station, the value of the quiet period parameter to a terminal of the CR system.

Examples of the present disclosure describe a base station device, including:
  a quiet period parameter value configuring module, to determine a maximum value of a quiet period parameter of a cognitive radio (CR) system, and determine a value of the quiet period parameter based on a sensing algorithm determined by a sensing algorithm selecting module;

the sensing algorithm selecting module, to determine the sensing algorithm based on a detecting performance requirement and the maximum value of the quiet period parameter; and a quiet period parameter sending module, to send the value of the quiet period parameter determined by the quiet period parameter value configuring module to a terminal of the CR system.

According to various examples of the present disclosure, the maximum value of the quiet period parameter of the CR system is determined, the sensing algorithm meeting the detecting performance requirement is determined based on the maximum value of the quiet period parameter, and the value of the quiet period parameter is revised based on the sensing algorithm. As such, the rationality of the configuration of the quiet period parameter of the CR system is improved and the capacity loss of the CR system is reduced when the interference to the authorization system is reduced.

DETAILED DESCRIPTION OF THE INVENTION

Hereinafter, the present disclosure will be described in further detail with reference to the accompanying drawings and examples.

Hereinafter, the examples of the present disclosure are described in further detail with reference to the accompanying drawings.

As mentioned earlier, the quiet period parameters mainly include the duration of the quiet period and a cycle of the quiet period. For convenience of description, in various examples of the present disclosure, the cycle of the quiet period is represented by SilenceCycle, and the duration of the quiet period is represented by SilenceDuration.

Figure 2:
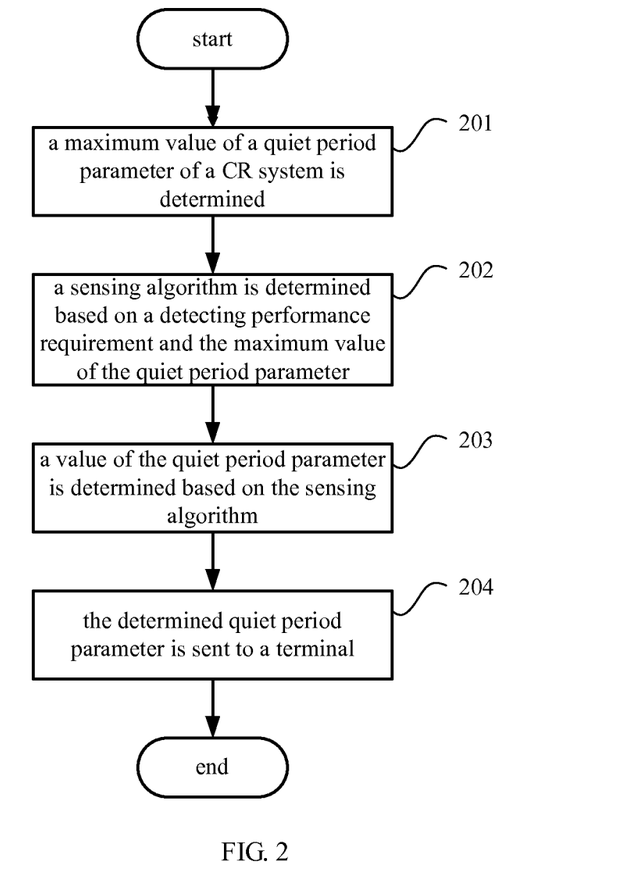
FIG. 2 is a flowchart illustrating a process for configuring a quiet period, according to an example of the present disclosure.

FIG. 2 is a flowchart illustrating a process for configuring a quiet period, according to an example of the present disclosure. As shown in FIG. 2, the process may include following operations.

At block 201, a base station may determine a maximum value of a quiet period parameter of a CR system.

At block 202, based on a detecting performance requirement and the maximum value of the quiet period parameter determined at block 201, the base station may determine a sensing algorithm.

At block 203, the base station may determine a value of the quiet period parameter based on the sensing algorithm determined at block 202.

At block 204, the base station may send the quiet period parameter determined at block 203 to a terminal.

Afterwards, the base station and the terminal of the CR system perform a quiet procedure according to the quiet period parameter.

At block 201 of the process as shown in FIG. 2, the base station may determine the maximum value of the quiet period parameter of the CR system based on maximum duration of interference which a radio authorization system may tolerate and maximum loss of capacity which the CR system may tolerate.

According to an example of the present disclosure, a constraint is proposed from the perspective of protecting the authorization system, i.e., the maximum duration of the interference which the authorization system may tolerate is $T_{interference}$, in order to reduce the interference to the authorization system resulting from the sensing detecting performed within the quiet period, a following requirement is required:

$$\text{SilenceCycle} - \text{SilenceDuration} + \text{Marg inTime} \leq T_{interference} \quad [1]$$

among them, Marg inTime is reserved time for other operations of the CR system after the authorization system is detected, such as system message transfer time, cell reestablishment time, etc.

According to another example of the present disclosure, a constraint is proposed from the perspective of protecting the CR system, i.e., a maximum loss ratio of the capacity which the CR system may tolerate may be defined as P % in a time domain, in order to minimize the capacity loss of the CR system, a following requirement is required:

$$\frac{\text{SilenceDuration}}{\text{SilenceCycle}} \leq P\% \quad [2]$$

Based on formulae (1) and (2), maximum values of SilenceCycle and SilenceDuration may be calculated, i.e., $$\text{SilenceDuration} \leq \frac{T_{interference} - \text{MarginTime}}{1 - P\%} \times P\% \quad [3]$$

$$\text{SilenceCycle} \leq \frac{T_{interference} - \text{MarginTime}}{1 - P\%} \quad [4]$$

At block 202 of the process as shown in FIG. 2, minimum duration of detecting time required by the sensing algorithm determined by the base station is not greater than the maximum value of SilenceDuration determined by the base station at block 201. For a specific sensing detecting performance requirement, each sensing algorithm corresponds to a requirement on the minimum duration of the detecting time, i.e., corresponds to different requirements on the duration of the quiet period. For different detecting performances, a correspondence relationship between the sensing algorithm and the requirement on the minimum duration of the detecting time may be shown in Table 1.

TABLE 1

A corresponding table of sensing detecting time required by the sensing algorithms under the sensing detecting performance requirements

| detecting performance requirement | sensing algorithm | requirement on the minimum duration of the detecting time |
|---|---|---|
| requirement 1 | sensing algorithm 1 | T1,1 |
|  | sensing algorithm 2 | T1,2 |
|  | . . . | . . . |

TABLE 1-continued

A corresponding table of sensing detecting time required by the sensing
algorithms under the sensing detecting performance requirements

| detecting performance requirement | sensing algorithm | requirement on the minimum duration of the detecting time |
|---|---|---|
| requirement 2 | sensing algorithm 1 | T2,1 |
| | sensing algorithm 2 | T2,2 |
| . . . | . . . | . . . |
| . . . | . . . | . . . |

For a detecting performance requirement, a sensing algorithm meeting the requirement on the minimum duration of the quiet period is determined. According to an example of the present disclosure, when $T_x \leq SilenceDuration_{max}$ (in which $SilenceDuration_{max}$ represents the maximum value of the duration of the quiet period), a sensing algorithm of which an index is x meets the detecting performance requirement. When there are multiple sensing algorithms meeting the detecting performance requirement, the base station may select, based on a predefined rule, a sensing algorithm from these sensing algorithms. When selecting from the multiple sensing algorithms meeting the detecting performance requirement, a sensing algorithm having minimum calculation complexity may be determined as the ultimate sensing algorithm, or a sensing algorithm having a minimum detecting time may be determined as the ultimate sensing algorithm, or the sensing algorithm may be determined by considering both of these two aspects.

Figure 3:
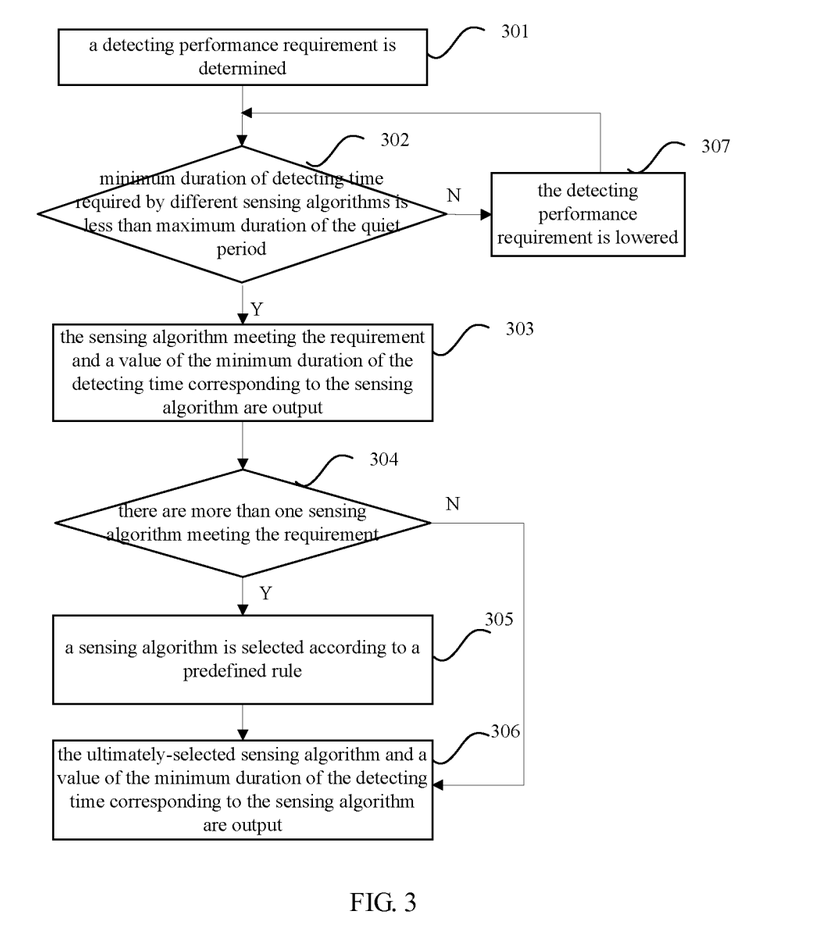
FIG. 3 is a flowchart illustrating a process for determining a sensing algorithm, according to an example of the present disclosure.

Based on the principle for determining the sensing algorithm as described above, FIG. 3 illustrates a process for determining the sensing algorithm, according to an example of the present disclosure. As shown in FIG. 3, the process may include following operations.

At block 301, a detecting performance requirement may be determined.

At block 302, whether minimum duration of detecting time required by each sensing algorithm is less than (or not greater than) a maximum value of SilenceDuration is determined. When a sensing algorithm meets the requirement, operations at block 303 may be performed. Otherwise, operations at block 307 may be performed.

At block 303, the sensing algorithm meeting the requirement and a value of the minimum duration of the detecting time corresponding to the sensing algorithm are output.

At block 304, whether there is another sensing algorithm meeting the requirement is determined. When there is the other sensing algorithm meeting the requirement, operations at block 305 may be performed. Otherwise, operations at block 306 may be performed.

At block 305, a sensing algorithm may be selected from the sensing algorithms meeting the detecting performance requirement according to a predefined rule.

At block 306, the ultimately-selected sensing algorithm and a value of the minimum duration of the detecting time corresponding to the sensing algorithm are output.

At block 307, the detecting performance requirement is lowered, and the operations at block 302 are performed.

At block 203 of the process as shown in FIG. 2, the base station configures a value of SilenceDuration as a value of the minimum duration of the detecting time required by the sensing algorithm determined at block 202. Based on the determined SilenceDuration, the base station configures SilenceCycle according to a following formula:

$$SilenceCycle = T_{interference} + SilenceDuration - MarginTime \quad [5]$$

At block 204 of the process as shown in FIG. 2, the process that the base station sends the quiet period parameter to the terminal is similar to the implementation in the prior art. For example, the quiet period parameter is encapsulated into a dedicated channel or a common channel and transmitted to the terminal.

According to an example of the present disclosure, during the process of performing the quiet procedure by the base station and the terminal, a quiet timer $T_{silence}$ is introduced, so that the quiet procedure is performed based on the quiet timer. During the running period of $T_{silence}$, the base station side and the terminal side stop transmitting/receiving of CR system data on a corresponding frequency and perform sensing detecting. When $T_{silence}$ is expired, the quiet procedure is ended and the normal data transmitting and receiving of the CR system is started.

According to an example of the present disclosure, after the base station configures the quiet period parameter and the terminal receives the quiet period parameter sent from the base station, the base station and the terminal respectively configure the quiet timer $T_{silence}$. In this case, a start cycle of $T_{silence}$ is SilenceCycle, and the timing duration of $T_{silence}$ is SilenceDuration. Running of $T_{silence}$ is started at a moment meeting formula (6):

$$(SFN \times 10 + subframe) \bmod SilenceCycle = StartSilenctOffset \quad [6]$$

among them, StartSilenctOffset is an offset, SFN represents a system frame number, subframe represents a subframe number or a timeslot number. When SFN and subframe meet the requirement of the formula together, SFN and subframe determine the start moment of the quiet procedure together.

As can be seen from the above description, according to the process for configuring the quiet period parameter described in various examples of the present disclosure, a range of values of the quiet period parameter is determined taking into account both the protection of the radio authorization system and the capacity loss of the CR system, so that the sensing algorithms are preliminarily filtered. The quiet period parameter is revised according to the sensing algorithm. As such, an appropriate sensing algorithm is selected and an appropriate quiet period parameter is determined in the case of controlling the interference to the authorization system, therefore the capacity loss of the CR system is greatly reduced.

Based on the same technical concept, various examples of the present disclosure describe a base station device.

Figure 4:
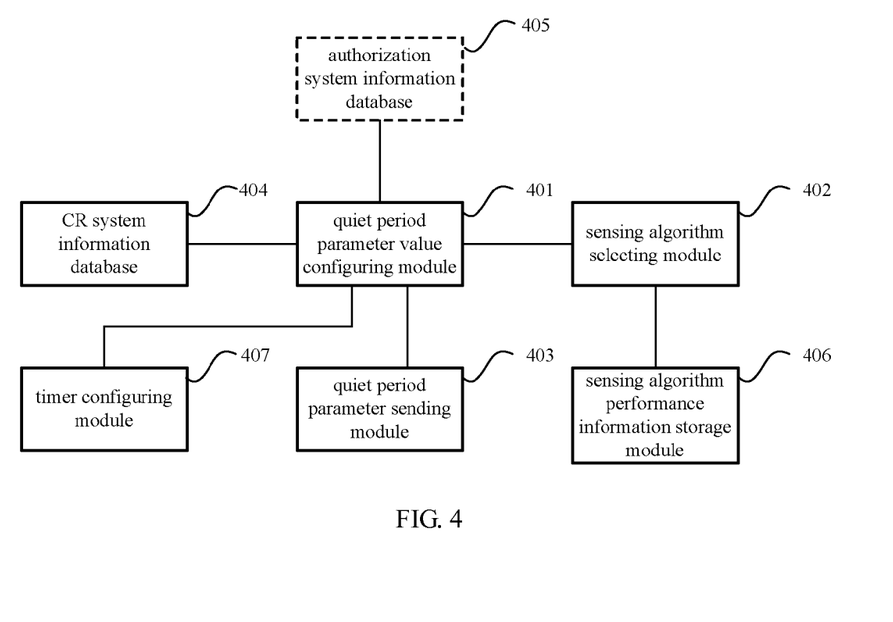
FIG. 4 is a schematic diagram illustrating a structure of a base station device, according to an example of the present disclosure.

FIG. 4 is a schematic diagram illustrating a structure of the base station device, according to an example of the present disclosure. As shown in FIG. 4, the base station device may include a quiet period parameter value configuring module 401, a sensing algorithm selecting module 402, and a quiet period parameter sending module 403.

According to an example of the present disclosure, some system parameters and sensing algorithm parameters required during the process of configuring the quiet period parameter may be stored in storage modules of the base station device. These storage modules may include:

a CR system information database 404, configured to provide information of a CR system, e.g., provide capacity loss (P %) that a sensing system may tolerate to the quiet period parameter value configuring module 401 and provide other information related to the CR system, to assist other modules to make a decision;

an authorization system information database 405, configured to provide system information of an authorization system, e.g., provide duration of interference ($T_{interference}$) that the authorization system may tolerate to the quiet period parameter value configuring module 401 and provide other information, to assist corresponding modules of the CR system to make a decision; and a sensing algorithm performance information storage module 406, configured to store minimum duration of sensing detecting time associated with different sensing algorithms under different detecting performance requirements.

According to an example of the present disclosure, the authorization system information database 405 may be located in the base station device, or located in a central control unit of the CR system so as to be accessed by multiple base stations of the CR system, or located outside the CR system in the form of a separate server which is maintained by a third party, the CR system may obtain an access right by paying costs.

The main functions of the modules may be described as follows.

The quiet period parameter value configuring module 401 may determine a maximum value of a quiet period parameter of the CR system, and send the maximum value of the quiet period parameter to the sensing algorithm selecting module 402. The quiet period parameter value configuring module 401 may determine a value of the quiet period parameter based on a sensing algorithm determined by the sensing algorithm selecting module 402, and send the value of the quiet period parameter to the quiet period parameter sending module 403.

The sensing algorithm selecting module 402 may determine the sensing algorithm based on a detecting performance requirement and the maximum value of the quiet period parameter, and send the determined sensing algorithm to the quiet period parameter value configuring module 401.

The quiet period parameter sending module 403 may send the quiet period parameter determined by the quiet period parameter value configuring module 401 to a terminal of the CR system.

According to an example of the present disclosure, the quiet period parameter value configuring module 401 may determine the maximum value of the quiet period parameter of the CR system based on maximum duration of interference that the radio authorization system may tolerate and maximum loss of capacity that the CR system may tolerate. For example, the quiet period parameter value configuring module 401 may determine the maximum value of the quiet period parameter of the CR system based on formulae (1) and (2), in which parameter P % is from the CR system information database 404, parameter $T_{interference}$ is from the authorization system information database 405, and parameter M arg inTime is from the CR system information database 404.

According to an example of the present disclosure, minimum duration of detecting time required by the sensing algorithm determined by the sensing algorithm selecting module 402 is not greater than a maximum value of duration of the quiet period determined by the quiet period parameter value configuring module 401. Further, when there are multiple sensing algorithms and minimum duration of detecting time required by each of the multiple sensing algorithms is not greater than the maximum value of the duration of the quiet period determined by the quiet period parameter value configuring module, the sensing algorithm selecting module 402 may select a sensing algorithm from the multiple sensing algorithms based on calculation complexity of each of the multiple sensing algorithms and/or the minimum duration of the detecting time required by each of the multiple sensing algorithms.

According to an example of the present disclosure, when determining the value of the quiet period parameter based on the sensing algorithm, the quiet period parameter value configuring module 401 may configure the duration of the quiet period as the minimum duration of the detecting time required by the sensing algorithm. In this case, the sensing algorithm is the sensing algorithm determined by the base station. The quiet period parameter value configuring module 401 may configure a cycle of the quiet period based on formula (5).

According to an example of the present disclosure, the base station device may further include a timer configuring module 407. The timer configuring module 407 may configure a timer, so that the base station device performs a quiet procedure based on the timer. In this case, a start cycle of the timer is the cycle of the quiet period determined by the quiet period parameter value configuring module 401, the timing duration of the timer is the duration of the quiet period determined by the quiet period parameter value configuring module 401, and a start moment of the timer satisfies formula (6).

Those skilled in the art can understand the modules in the device of example embodiments of the present disclosure may be located in the device as described in the example embodiments, or may be located in one or more devices of the example embodiments of the present disclosure when modified accordingly. The modules in examples of the present disclosure may be combined into one module, or may be further divided into multiple sub-modules.

According to the description of the above examples, it can be clearly understood by those skilled in the art that the examples of the present disclosure can be implemented by software accompanying with necessary general hardware platforms, or by hardware. Based on this, the essential parts of the technical solution mentioned above or the part contributed to the prior art can be presented in the form of a software product. The software product may be stored in a storage medium, and includes a plurality of machine-readable instructions for making a terminal device (which can be a mobile phone, a personal computer, a server, or a network device) implement methods recited in the examples of the present disclosure.

The above are several examples of the present disclosure, and are not used for limiting the protection scope of the present disclosure. Any modifications, equivalents, improvements, etc., made under the principle of the present disclosure should be included in the protection scope of the present disclosure.

The invention claimed is:

1. A method for configuring a quiet period in a cognitive radio (CR) system, comprising:
    determining, by a base station, a maximum value of a quiet period parameter of a CR system;
    determining, by the base station, a sensing algorithm based on a detecting performance requirement and the maximum value of the quiet period parameter, wherein the sensing algorithm is one of energy detection, matched filter detection and self-correlation detection;
    determining, by the base station, a value of the quiet period parameter based on the sensing algorithm; and
    sending, by the base station, the value of the quiet period parameter to a terminal of the CR system;
    configuring a timer on the base station and the terminal respectively, wherein during a running period of the timer, the base station and the terminal stop transmitting and receiving of CR system data on a frequency and perform sensing detecting, and when the timer is expired, the base station and the terminal perform the transmitting and receiving of the CR system data;

wherein the quiet period parameter of the CR system comprises a time cycle of the quiet period and duration of the quiet period;

the operation of determining, by the base station, the value of the quiet period parameter based on the sensing algorithm comprises:

configuring, by the base station, a value of the duration of the quiet period as a value of minimum duration of detecting time required by the sensing algorithm determined by the base station; and configuring, by the base station, the time cycle of the quiet period based on a following formula:

$$SilenceCycle = T_{interference} + SilenceDuration - M \arg inTime$$

wherein SilenceCycle is the time cycle of the quiet period, SilenceDuration is the duration of the quiet period of which the value is equal to the value of the minimum duration of the detecting time required by the sensing algorithm determined by the base station, M arg inTime is reserved time for operations of the CR system after a radio authorization system is detected, and $T_{interference}$ is maximum interference duration predefined by the radio authorization system.

2. The method of claim 1, wherein the operation of determining, by the base station, the maximum value of the quiet period parameter of the CR system comprises:

determining, by the base station, the maximum value of the quiet period parameter of the CR system based on maximum interference duration predefined by a radio authorization system and maximum capacity loss predefined by the CR system.

3. The method of claim 2, wherein the base station determines a maximum value of the time cycle of the quiet period and a maximum value of the duration of the quiet period based on following formulae:

$$SilenceCycle - SilenceDuration + M \arg inTime \leq T_{interference}, \text{ and}$$

$$\frac{SilenceDuration}{SilenceCycle} \leq P\%$$

wherein SilenceCycle is the time cycle of the quiet period, SilenceDuration is the duration of the quiet period, M arg inTime is reserved time for operations of the CR system after the radio authorization system is detected, $T_{interference}$ is the maximum interference duration predefined by the radio authorization system, and P % is a maximum capacity loss ratio predefined by the CR system.

4. The method of claim 1, wherein the quiet period parameter of the CR system comprises duration of the quiet period, and a minimum duration of detecting time required by the sensing algorithm determined by the base station is not greater than a maximum value of the duration of the quiet period determined by the base station.

5. The method of claim 4, further comprising:

when there are multiple sensing algorithms and minimum duration of detecting time required by each of the multiple sensing algorithms is not greater than the maximum value of the duration of the quiet period determined by the base station, selecting, by the base station, a sensing algorithm from the multiple sensing algorithms based on the minimum duration of the detecting time required by each of the multiple sensing algorithms.

6. The method of claim 1, wherein the quiet period parameter of the CR system comprises a time cycle of the quiet period and duration of the quiet period, a start cycle of the timer is the time cycle of the quiet period determined by the base station, timing duration of the timer is the duration of the quiet period determined by the base station, and a start moment of the timer satisfies a following formula:

$$(SFN \times 10 + subframe) \bmod SilenceCycle = StartSilenctOffset$$

wherein SFN represents a system frame number, subframe represents a subframe number or a timeslot number, SilenceCycle is the time cycle of the quiet period, and StartSilenctOffset is an offset.

7. A base station device, comprising:

a processor and a non-transitory storage, wherein the non-transitory storage is to store one or more instructions to be executed by the processor, and the one or more instructions comprise:

a quiet period parameter value configuring instruction, to determine a maximum value of a quiet period parameter of a cognitive radio (CR) system, and determine a value of the quiet period parameter based on a sensing algorithm determined by a sensing algorithm selecting instruction, wherein the sensing algorithm is one of energy detection, matched filter detection and self-correlation detection;

the sensing algorithm selecting instruction, to determine the sensing algorithm based on a detecting performance requirement and the maximum value of the quiet period parameter;

a quiet period parameter sending instruction, to send the value of the quiet period parameter determined by the quiet period parameter value configuring instruction to a terminal of the CR system; and a timer configuring instruction, to configure a timer on the base station device, wherein during a running period of the timer, the base station device stops transmitting and receiving of CR system data on a frequency and performs sensing detecting, and when the timer is expired, the base station device performs the transmitting and receiving of the CR system data;

wherein the quiet period parameter of the CR system comprises a time cycle of a quiet period and duration of the quiet period;

when determining the value of the quiet period parameter based on the sensing algorithm, the quiet period parameter value configuring instruction is further to:

configure a value of the duration of the quiet period as a value of the minimum duration of detecting time required by the sensing algorithm determined by the sensing algorithm selecting instruction; and configure the time cycle of the quiet period based on a following formula:

$$SilenceCycle = T_{interference} + SilenceDuration - M \arg inTime$$

SilenceCycle wherein is the time cycle of the quiet period, SilenceDuration is the duration of the quiet period of which the value is equal to the value of the minimum duration of the detecting time required by the sensing algorithm determined by the sensing algorithm selecting instruction, M arg inTime is reserved time for operations of the CR system after a radio authorization system is detected, and $T_{interference}$ is maximum interference duration predefined by the radio authorization system.

8. The base station device of claim 7, wherein the quiet period parameter value configuring instruction is further to determine the maximum value of the quiet period parameter of the CR system based on maximum interference duration predefined by a radio authorization system and maximum capacity loss predefined by the CR system.

9. The base station device of claim 8, wherein
the quiet period parameter value configuring instruction is further to determine a maximum value of the time cycle of the quiet period and a maximum value of the duration of the quiet period based on following formulae:

$$SilenceCycle-SilenceDuration+M \arg inTime \leq T_{interference}, \text{ and}$$

$$\frac{SilenceDuration}{SilenceCycle} \leq P\%$$

wherein SilenceCycle is the time cycle of the quiet period, SilenceDuration is the duration of the quiet period, M arg inTime is reserved time for operations of the CR system after the radio authorization system is detected, $T_{interference}$ is the maximum interference duration predefined by the radio authorization system, and P % is a maximum capacity loss ratio predefined by the CR system.

10. The base station device of claim 7, wherein the quiet period parameter of the CR system comprises duration of a quiet period, and a minimum duration of detecting time required by the sensing algorithm determined by the sensing algorithm selecting instruction is not greater than a maximum value of the duration of the quiet period determined by the quiet period parameter value configuring instruction.

11. The base station device of claim 10, wherein when there are multiple sensing algorithms and minimum duration of detecting time required by each of the multiple sensing algorithms is not greater than the maximum value of the duration of the quiet period determined by the quiet period parameter value configuring instruction, the sensing algorithm selecting instruction is further to select a sensing algorithm from the multiple sensing algorithms based on the minimum duration of the detecting time required by each of the multiple sensing algorithms.

12. The base station device of claim 7, wherein the quiet period parameter of the CR system comprises a time cycle of a quiet period and duration of the quiet period, a start cycle of the timer is the time cycle of the quiet period determined by the quiet period parameter value configuring instruction, a timing duration of the timer is the duration of the quiet period determined by the quiet period parameter value configuring instruction, and a start moment of the timer satisfies a following formula:

(SFN×10+subframe)mod SilenceCycle=StartSilenctOffset wherein SFN represents a system frame number, sub frame represents a subframe number or a timeslot number, SilenceCycle is the time cycle of the quiet period, and StartSilenctOffset is an offset.

* * * * *